(12) United States Patent
Sato et al.

(10) Patent No.: US 6,341,102 B1
(45) Date of Patent: Jan. 22, 2002

(54) DATA WRITING/READING APPARATUS

(75) Inventors: Tadashi Sato; Haruhiko Izumi; Goro Kawasaki; Satoshi Shimokawa, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/433,328

(22) Filed: Nov. 3, 1999

(30) Foreign Application Priority Data

Nov. 9, 1998 (JP) .......................................... 10-317531

(51) Int. Cl.[7] ..................... G11B 11/00; G11B 20/20; G11B 5/00; G11B 21/22; G11B 5/54
(52) U.S. Cl. ..................... 369/13; 360/76; 360/255.1
(58) Field of Search ......................... 369/13, 272, 291; 360/76, 255.1, 254.2, 131, 132, 133

(56) References Cited

U.S. PATENT DOCUMENTS

| | | | | |
|---|---|---|---|---|
| 4,800,455 A | * | 1/1989 | Takizawa | 360/234.7 |
| 5,247,416 A | * | 9/1993 | Shiba et al. | 360/133 |
| 5,263,008 A | * | 11/1993 | Fujio et al. | 369/13 |
| 5,351,229 A | * | 9/1994 | Brezoczky et al. | 369/99 |
| 5,452,151 A | * | 9/1995 | Money et al. | 360/75 |
| 6,178,150 B1 | * | 1/2001 | Davis | 369/14 |
| 6,226,233 B1 | * | 5/2001 | McDaniel et al. | 369/13 |

FOREIGN PATENT DOCUMENTS

| | | |
|---|---|---|
| JP | 61253679 | 11/1986 |
| JP | 4325464 | 12/1993 |
| JP | 5334828 | 12/1993 |

* cited by examiner

*Primary Examiner*—Hoa T. Nguyen
*Assistant Examiner*—Julie Anne Watko
(74) *Attorney, Agent, or Firm*—Greer, Burns & Crain, Ltd.

(57) ABSTRACT

A data handling apparatus is provided which includes a rotatable disk provided with at least an innermost track and an outermost track for storing data, and a disk cartridge for housing the disk. The disk cartridge is formed with an opening for exposure of a portion of the disk. The opening is substantially symmetrical with respect to a first center line extending radially of the disk. The data handling apparatus also includes a slider floatable relative to the disk, and a driving mechanism for moving the slider relative to the disk along a transfer path. This transfer path and the first center line of the opening are arranged to be non-parallel to each other.

8 Claims, 7 Drawing Sheets

DATA WRITING/READING APPARATUS

BACKGROUND OF THE INVENTION

1. Field of the Invention

The present invention relates to a data handling apparatus capable of writing and/or reading data in and/or from a storage medium such as a magnetic disk, an optical disk and a magneto-optical disk. In particular, the present invention relates to a data handling apparatus capable of writing and/or reading data in and/or from a data storage disk which is housed in a disk cartridge having a slidable shutter.

2. Description of the Related Art

As is conventionally known, for reading out data stored in a magnetic disk and/or writing data in the disk, use may be made of a magnetic head which is brought into facing relation to the disk. Such a magnetic head may be formed as a slider which is arranged to float above the rotating magnetic disk by the action of a fluid wedge formed between the slider and the disk. Similarly, an optical head formed as a floatable slider may be used for transferring data to and from a magneto-optical disk.

Typically, such a floatable slider is supported by an elastic member called "suspension." In operation, the suspension serves to urge the slider toward the rotating data storage disk with a suitable elastic force. As the disk is rotated, air is dragged into a space between the slider and the rotating disk, thereby forming a fluid wedge whose positive pressure causes the slider to float above the disk.

For performing proper data-recording and/or data-reading operation, it is desirable to control the floating amount of the slider, so that the slider is kept floating at a constant distance from the disk, no matter what tracks of the disk the slider is located on. In order to achieve this goal, however, the following problem should be solved.

Supposing that the disk is rotated at a constant angular velocity, the slider unfavorably tends to float to a greater extent when it is located on an outer track than when located on an inner track of the disk. This is because when the slider is located on an outer track, the tangential velocity of the rotating disk relative to the slider becomes higher, whereby the pressure of the fluid wedge formed between the slider and the disk becomes greater.

A conventional technique for overcoming the above problem is disclosed for example in JP-A-61(1986)-253679 and JP-A-5(1993)-334828. According to the teachings of these references, the skew angle of the slider is rendered to become greater as the slider is moved from an inner track to an outer track of the disk. (Here, the skew angle is defined as an angle made between the central line of the slider and the tangent line to the track on which the slider is located.)

In this manner, when the slider is moved to an outer track of the disk, the slider tends to receive a smaller floating force from the fluid wedge formed between the slider and the disk. As a result, the difference in floating amount of the slider can be reduced, whether the slider is on an inner track or on an outer track.

Though the teachings of the prior art are useful for adjusting the floating amount of the slider, the conventional technique can be applied only to a hard disk device of a computer, but not to a magneto-optical disk contained in a disk cartridge. Actually, the prior art technique cannot be applied to a cartridge-contained disk because the mechanism of the prior art is difficult (or even impossible) to be made suitably smaller in size.

SUMMARY OF THE INVENTION

The present invention has been proposed under the above circumstances, and its objective is to overcome the problem described above.

According to the present invention, there is provided a data handling apparatus comprising:

a rotatable disk provided with at least an innermost track and an outermost track for storing data;

a disk cartridge for housing the disk, the disk cartridge being formed with an opening for exposure of a portion of the disk, the opening being elongated along a first center line extending radially of the disk;

a slider floatable relative to the disk, the slider being provided with a leading portion and a trailing portion; and a driving mechanism for moving the slider relative to the disk along a predetermined path;

wherein the predetermined path of the slider and the first center line are non-parallel to each other.

According to a preferred embodiment, the slider may have a second center line with respect to which the slider is substantially symmetrical. In this case, the second center line of the slider may be arranged to substantially coincide with a tangent line to the innermost track of the disk when the slider is located on the innermost track.

According to another preferred embodiment, the second center line of the slider may be inclined inward relative to the tangent line to the innermost track of the disk when the slider is located on the innermost track.

Preferably, the slider located on the outermost track may be positioned closer to the first center line than the slider located on the innermost track is.

The slider may be provided with a first objective lens. In this case, the first objective lens may be positioned closer to the trailing portion of the slider than to the leading portion thereof.

Preferably, the driving mechanism may include an actuator supporting a second objective lens. In this case, the first and the second objective lenses may be arranged to work together to provide a lens system.

It is possible for the slider to comprise a magnetic head.

Other objects, features and advantages of the present invention will become clearer from the following detailed description given with reference to the accompanying drawings.

DETAILED DESCRIPTION OF THE PREFERRED EMBODIMENTS

Preferred embodiments of the present invention will be described below with reference to the accompanying drawings.

Figure 1:
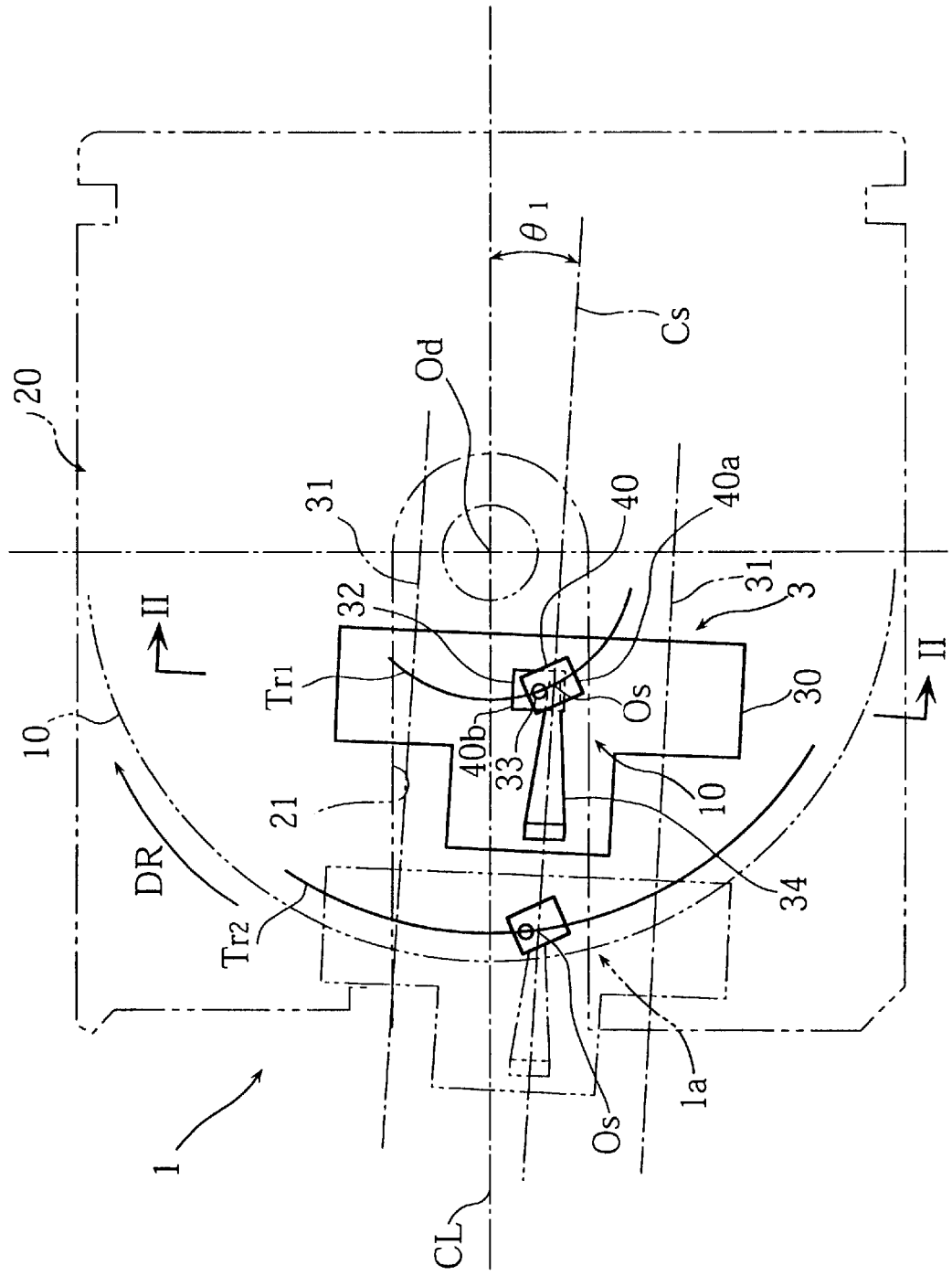
FIG. 1 is a plan view schematically showing principal portions of a data handling apparatus according to a first embodiment of the present invention.
Figure 2:
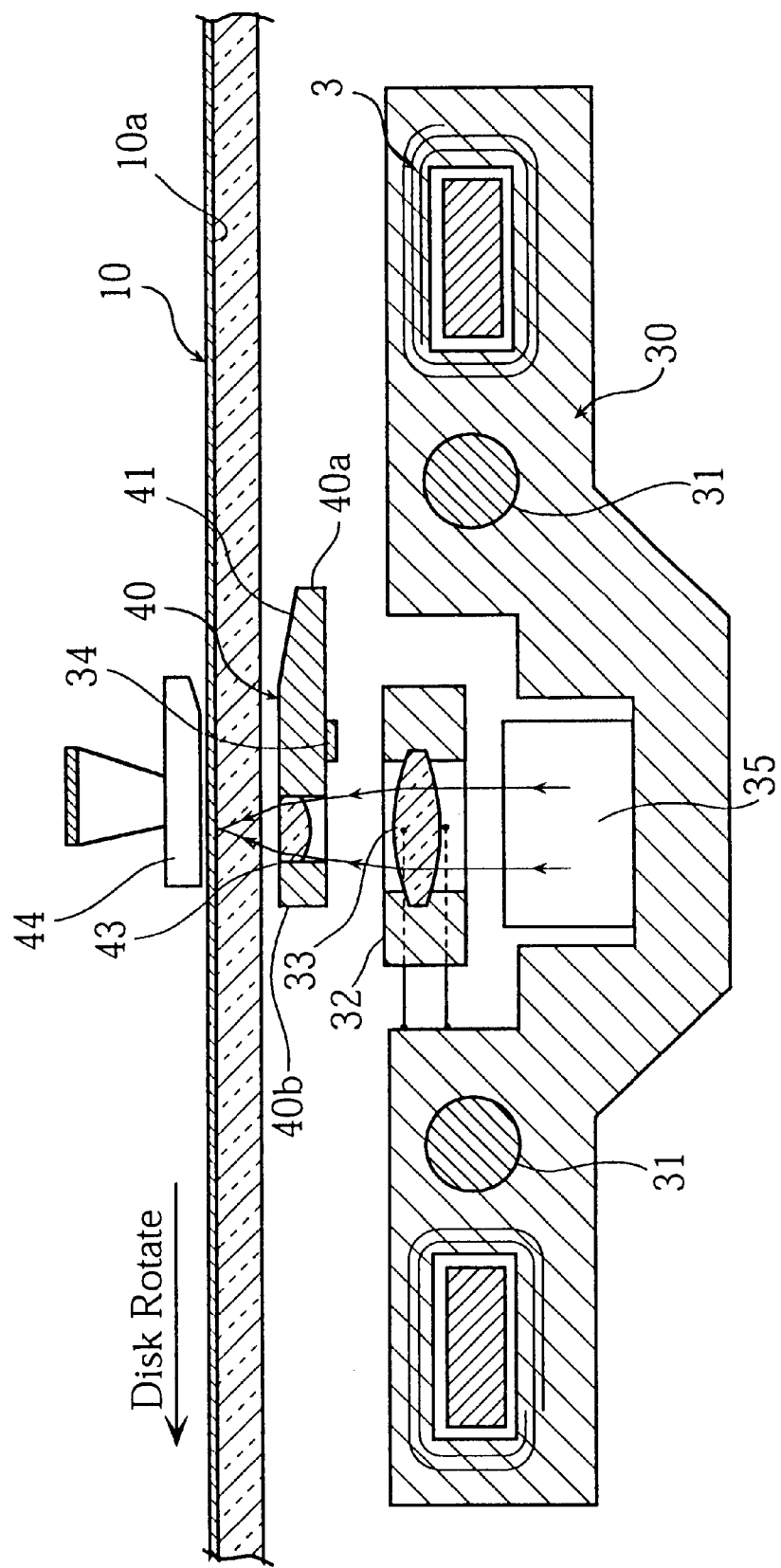
FIG. 2 is a sectional view taken along lines II—II in FIG. 1.
Figure 3:
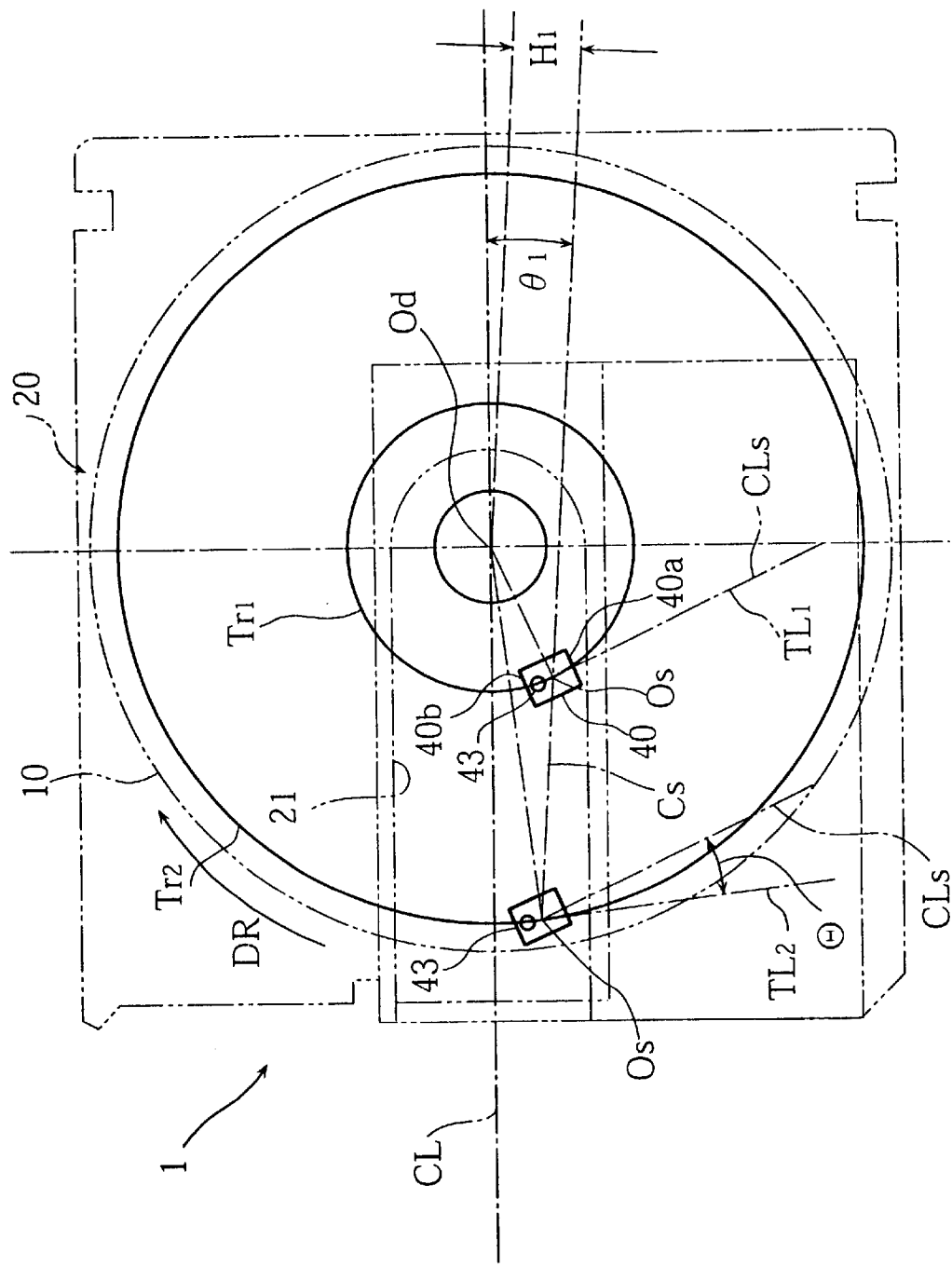
FIGS. 3–5 are plan views illustrating the workings of the data handling apparatus of the first embodiment.

Reference is first made to FIGS. 1–3 showing a magneto-optical disk apparatus 1 according to a first embodiment of the present invention. The apparatus 1 in this embodiment is capable of writing and reading data in and from a magneto-optical disk 10 housed in a disk cartridge 20. As will become clearer from the following description, the gist of the present invention resides in the operating manner of an optical head 1a of the apparatus 1.

As shown in FIGS. 1 and 3, the disk cartridge 20 houses the magneto-optical disk 10. Within the cartridge 20, the disk 10 is arranged to rotate in a predetermined direction DR about a central axis Od. The disk cartridge 20 is formed with an opening 21 (indicated by double-dot chain lines) for exposing a portion of the disk 10, so that the optical head 1a can access the exposed portion of the disk 10.

The opening 21 of the disk cartridge 20 is elongated in the direction of a central line CL (which passes through the axis Od) and has a predetermined width. As illustrated, the opening 21 is generally symmetrical with respect to the central line CL. Though not shown, the disk cartridge 20 is provided with a slidable shutter for closing the opening 21. When the disk cartridge 20 is not inserted into the magneto-optical disk apparatus 1, the opening 21 is closed by the shutter for protection of the disk 10. However, once the disk 10 is inserted into the apparatus 1, the non-illustrated shutter is opened by a suitable shutter opening mechanism (not shown).

As shown in FIG. 2 (and FIG. 1 as well), a movable carriage 30 is provided below the disk cartridge 20 for carrying the optical head 1a. The carriage 30 is slidably supported by a pair of parallel guide rods 31, which extend perpendicularly to the sheet surface of FIG. 2. For causing the carriage 30 to move along the guide rods 31, use is made of a driving mechanism 3 including, among other things, a linear voice coil motor. In the operation of the driving mechanism 3, the carriage 30 (and consequently, the optical head 1a) is moved in directions transverse to the tracks of the magneto-optical disk 10.

The carriage 30 supports an actuator 32 which in turn carries a first objective lens 33. The actuator 32 serves to move the first objective lens 33 vertically (i.e., toward and away from the disk 10). In this manner, the focus control of the lens system of the apparatus 1 is performed.

In the illustrated embodiment, the actuator 32 is not designed to move the lens 33 in directions for performing the track control of the lens system. Alternatively, the actuator 33 may be provided with a track control function in addition to the focus control function. In this case, the actuator 33 serves as a two-dimensional actuator capable of moving the first objective lens 33 vertically (toward and away from the disk 10) as well as horizontally (transversely to the tracks of the disk 10).

As shown in FIG. 1, the carriage 30 also supports a slider 40 via an elastic suspension member 34 which may be a plate spring. The lower end of the suspension member 34 is fixed to the carriage 30, while the upper end of the suspension member 34 is attached to the slider 40 via a gimbal spring for example.

As shown in FIG. 2, the apparatus 1 includes a second slider 44 which is disposed opposite to the first slider 40 with respect to the disk 10. Though not illustrated, the second slider 44 is provided with coils used for performing magnetic field modulation.

In operation, the elastic suspension member 34 urges the slider 40 toward the disk 10 through the opening 21 of the disk cartridge 20. On the other hand, when the disk 10 is being rotated, a fluid wedge is formed between the disk 10 and the slider 40, whereby the slider 40 is urged away from the disk 10. In combination of these two opposite phenomena, the slider 40 is caused to "float" with respect to the disk 10.

For ensuring that the slider 40 floats properly, the slider 40 is provided with an inclined portion 41 adjacent to the leading edge 40a. With such an arrangement, air is easily introduced into the space between the disk 10 and the slider 40. The floating amount of the slider 40 relative to the disk 10 depends on both the tangential velocity of the disk 10 relative to the slider 40 and the inclination angle (skew angle) of the slider 40 relative to the recording tracks of the disk 10.

As shown in FIG. 2, the slider 40 holds a second objective lens 43 whose optical axis substantially coincides with the optical axis of the first objective lens 33. With such an arrangement, a laser beam emitted from a light source (not shown) is reflected on a mirror 35 to be directed toward the first and the second objective lenses 33, 43. After passing through the two lenses, the laser beam is caused to converge to form a laser spot on a recording layer 10a of the disk 10.

As described above, the lens system of the illustrated apparatus 1 utilizes two objective lenses 33, 43. In this manner, a high numerical aperture is obtained, thereby causing the apparatus 1 to perform a high density recording. The focus control of the lens system is performed based on focus error signals obtained by detecting the light reflected on the disk 10.

The slider 40 is caused to move along a linear path Cs since it is mounted on the movable carriage 30 which is guided by the linearly extending guide rods 31. In the illustrated. embodiment, as shown in FIGS. 1 and 3, the path Cs of the slider 40 is arranged not to pass through the central axis Od, of the disk 10.

Specifically, thee path Cs of the slider 40 makes an angle of $\theta_1$ in relation to the central line CL of the opening 21 of the disk cartridge 20, with the slider 40 being located upstream of the disk-rotating direction DR from the central line CL of the opening 21 of the disk 10. (As viewed in FIGS. 1 and 3, the slider 40 is positioned below the central line CL.) In this arrangement, the slider 40 is positioned closer to the central line CL when it is on the outermost recording track $Tr_2$ than when it is on the innermost recording track $Tr_1$. In FIG. 3, the deviation of the path Cs of the slider 40 relative to the axis Od is represented by $H_1$.

Further, in the illustrated embodiment, the posture of the slider 40 is determined so that the central line CLs of the slider 40 coincides with the tangent line $TL_1$ to the innermost track $Tr_1$ when the slider 40 is on the track $Tr_1$, as shown in FIG. 3.

With the above arrangement, as the slider 40 is moved. outward (i.e., farther away from the central axis Od of the disk 10) along the path Cs, the skew angle $\Phi$, which is defined between the central line CLs of the slider 40 and the tangent. line TL to a particular recording track on which the slider 40 is located, will become greater, starting from zero (which corresponds to the slider 40 located on the innermost track $Tr_1$). The advantage obtained from the thus increasing skew angle is as follows.

If the slider 40 were caused to move along a linear path passing through the central axis Od of the disk 10, the skew angle $\Phi$ would be kept the same, whatever track the slider 40 is located on. In this instance, supposing that the disk 10 is being rotated at a constant angular velocity, the slider 40, when located on an outer track, will be spaced away from the disk 10 to a greater extent than when the slider 40 is on an inner track (see FIG. 7, line (a)).

This is because the tangential velocity of the disk 10 relative to the slider 40 becomes greater (even when the angular velocity of the disk 10 is constant) as the slider 40 is moved from an inner track to an outer track of the disk 10. In this instance, the pressure of the fluid wedge formed between the disk 10 and the slider 40 will increase as the slider 40 is brought farther away from the central axis Od of the disk 10. As a result, the slider 40 is rendered to float at a higher (or lower) position relative to the disk 10 than when the slider 40 is closer to the axis Od.

According to the first embodiment of the present invention, the skew angle $\Phi$ becomes greater as the slider 40 is shifted from an inner track of the disk 10 to an outer track of the disk 10. In general, when the skew angle $\Phi$ increases, the force to keep the slider 40 floating relative to the disk 10 becomes weaker (on condition that the tangential velocity of the rotating disk 10 relative to the slider 40 is constant).

Thus, according to the illustrated embodiment of the present invention, the difference in floating or buoyancy force acting on the slider 40 is advantageously made smaller, no matter which track the slider 40 is located on. Accordingly, the variation in floating amount of the slider 40 relative to the disk 10 is reduced, as shown by line (b) in FIG. 7.

Further, in the first embodiment of the present invention, the deviation of the path Cs from the axis Od of the disk 10 is provided by inclining the path Cs relative to the center line CL of the opening 21 of the disk cartridge 20. In this manner, the deviation H1 of the path Cs from the axis Od can be made sufficiently large in spite of the fact that the slider 40 is moved only in a limited area defined by the opening 21. This means that it is possible to obtain an appropriately large difference in skew angle between the slider 40 located on the innermost track Tr1 and the slider 40 located on the outermost track Tr2.

Figure 4:
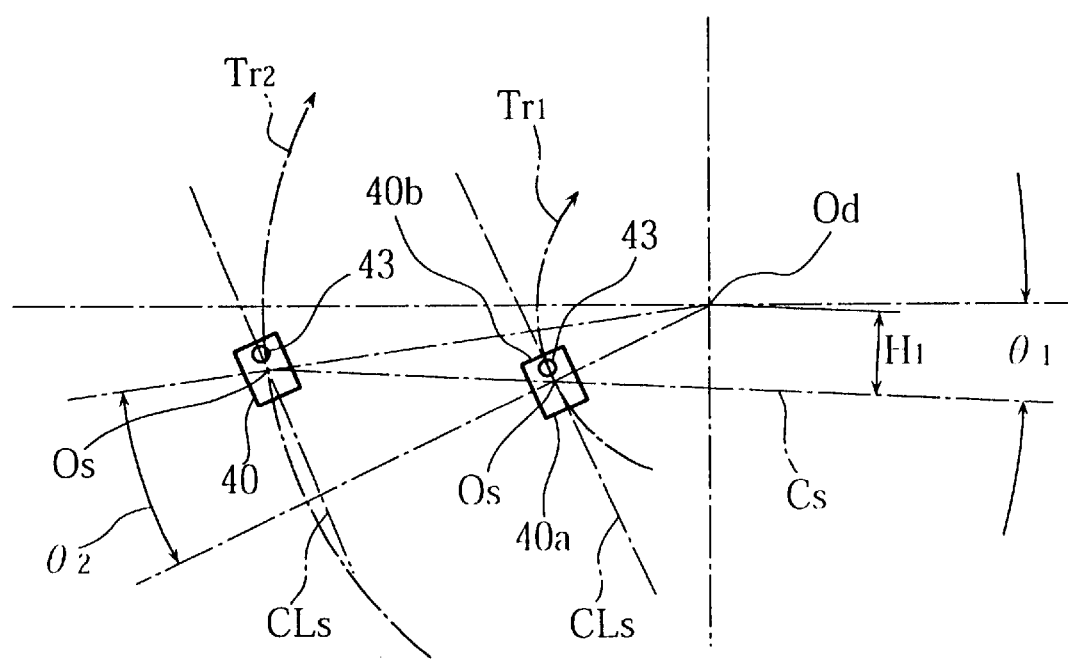
Figure 5:
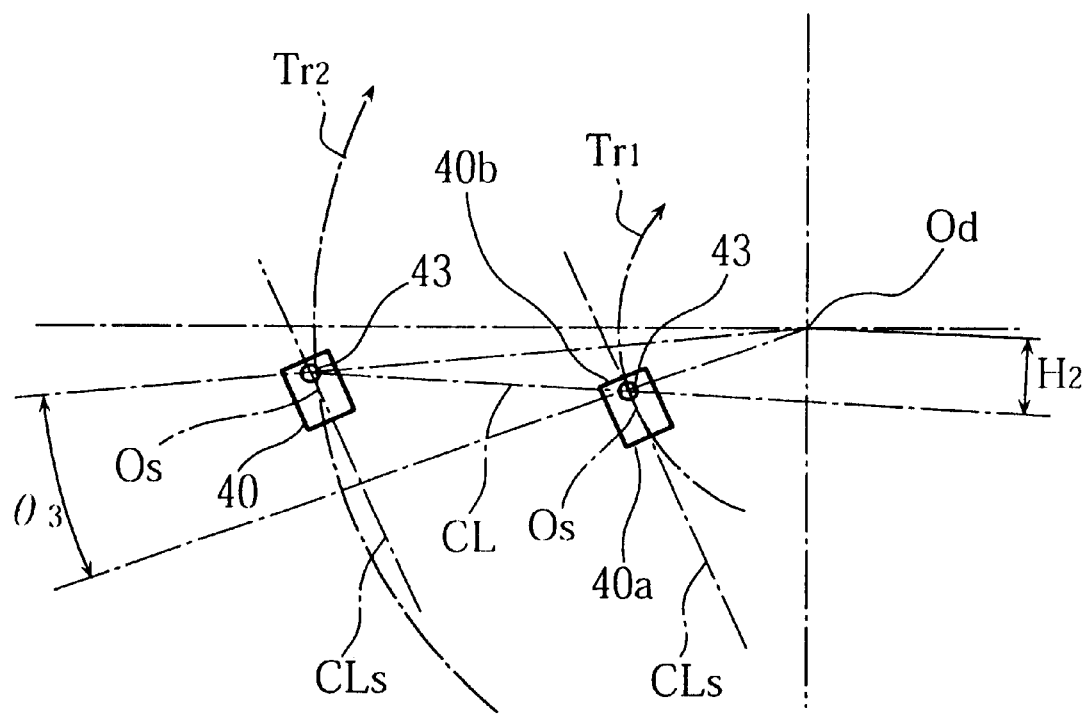

As shown in FIGS. 4 and 5, the second objective lens 43 carried by the slider 40 is positionally offset toward the trailing portion 40b from the center Os of the slider 40. With such an arrangement, the deviation H2 of a lens transfer path CL from the axis Od is rendered smaller than the deviation H1 of the transfer path Cs of the slider 40 (precisely, the deviation of the transfer path Cs of the center Os of the slider 40). Therefore, the skew angle variation $\theta_3$ of the objective lens 43 (see FIG. 5) becomes smaller than the skew angle variation $\theta_2$ of the slider 40 (see FIG. 4). This serves to minimize the deterioration of the optical data reproduction which is caused by the variation of optical skew.

In addition, in the first embodiment, the skew angle $\Phi$ (see FIG. 3) defined between the center line CLs of the slider 40 and a tangent line to an outer track (on which the slider 40 is located) is made on the inner side of the tangent line. In other words, the center line CLs is inclined toward the axis Od of the disk 10 relative to the tangent line to the outer track. Such an arrangement serves to stabilize the floating action of the slider 40 relative to the rotating disk 10.

Figure 6:
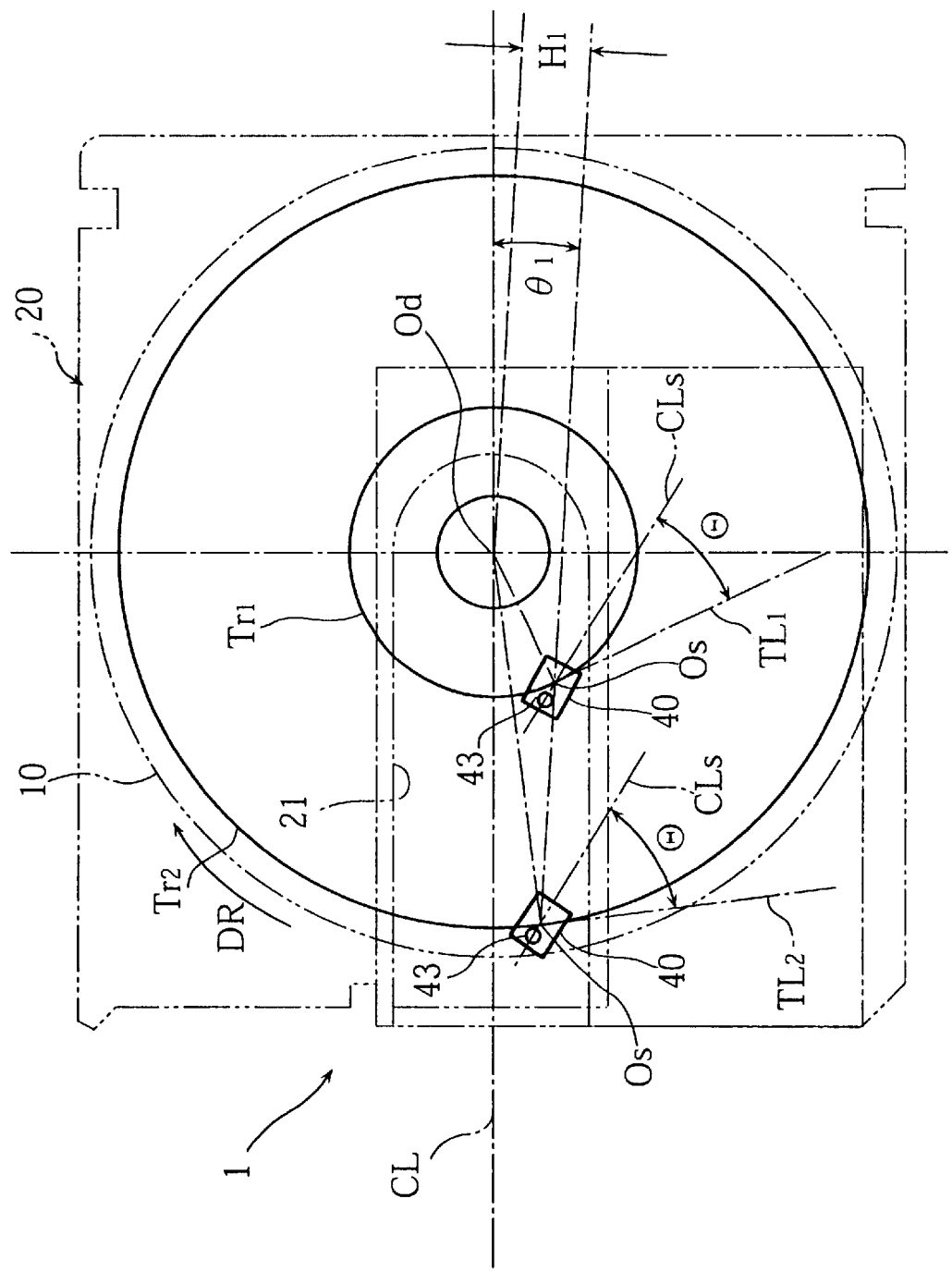
FIG. 6 is a plan view schematically showing principal portions of a data handling apparatus according to a second embodiment of the present invention.

Reference is now made to FIG. 6 showing a data handling apparatus according to a second embodiment of the present invention. As seen from the figure, the illustrated apparatus 1 is similar to the apparatus of the first embodiment except for the following point. That is, in the second embodiment, the center line CLs of the slider 40 located on the innermost track Tr1 is inclined inward (i.e., toward the axis Od) relative to the tangent line TL1 to the innermost track Tr1.

Figure 7:
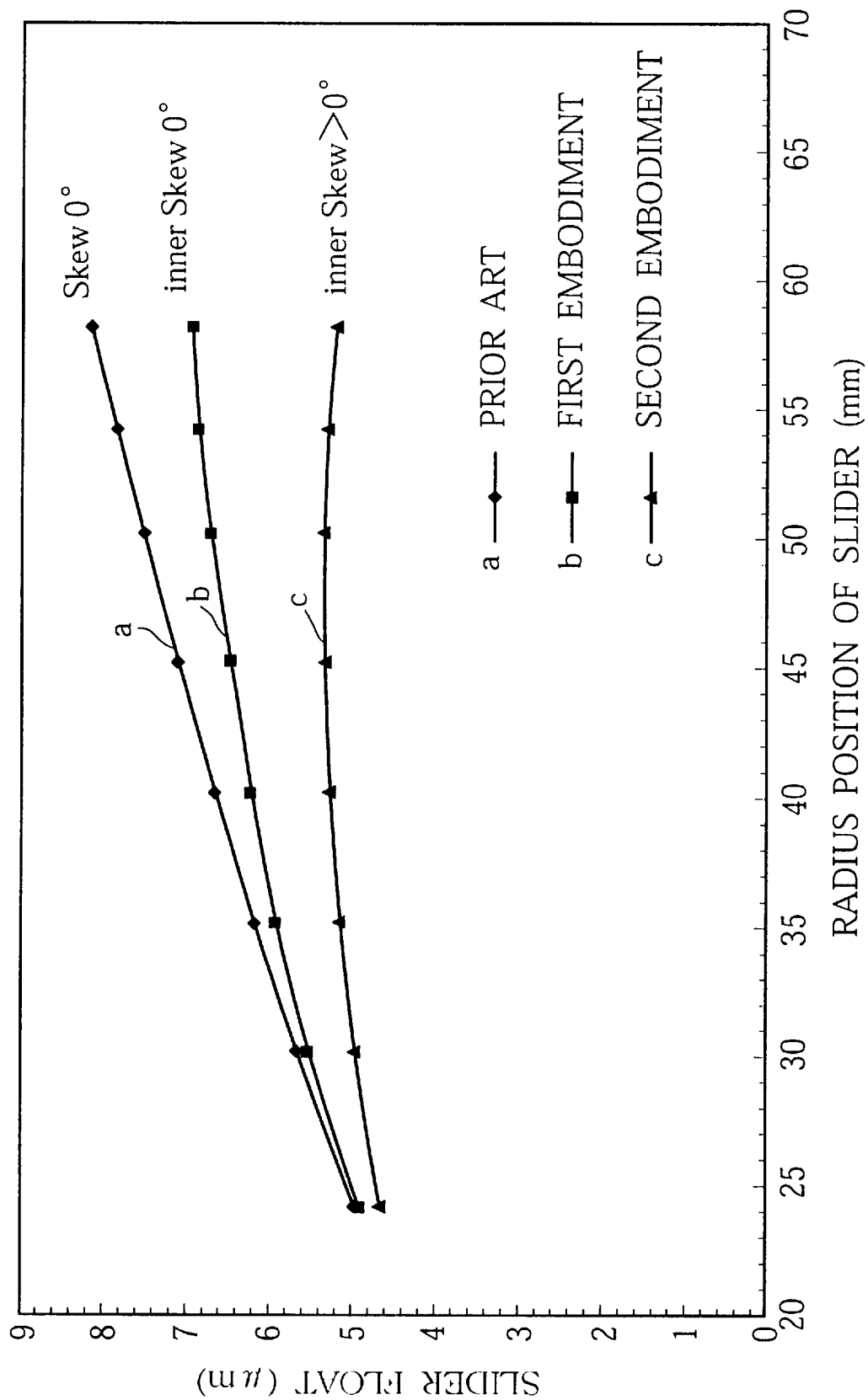
FIG. 7 is a graph showing the relationship between the radial position of a slider and the floating amount of the slider.

With such an arrangement, as shown by line (c) in FIG. 7, the floating amount of the slider 40 is rendered substantially constant, no matter which track the slider 40 is located on. Clearly, the advantages obtainable from the first embodiment can also be obtained from the second embodiment.

It should be appreciated that the present invention is not to be limited to the above described embodiments. For instance, in the above embodiments, the slider 40, to which the gist of the present invention is applied, is a component of the optical head used in the magneto-optical disk apparatus 1. However, the present invention is also applicable to a magnetic head which is formed as a floatable slider and used for reading and/or writing data from and/or in a magnetic disk.

Further, in the illustrated embodiments, the transfer path Cs of the slider 40 is so oriented as to cause the slider 40 located on an inner track to be spaced farther away from the center line CL of the opening 21. Alternatively, the transfer path Cs may be conversely oriented so that the slider 40 located on an inner track is brought closer to the center line CL of the opening 21.

What is claimed is:

1. A data handling apparatus comprising:

a rotatable disk provided with at least an innermost track and an outermost track for storing data;

a disk cartridge for housing the disk, the disk cartridge being formed with an opening for exposure of a portion of the disk, said opening being elongated along a first center line extending radially of the disk;

a slider floatable relative to the disk, the slider being provided with a leading portion and a trailing portion; and a driving mechanism for moving the slider within said opening relative to the disk along a predetermined straight path extending between the innermost track and the outermost track;

wherein the predetermined path of the slider is non-parallel to the first center line and non-radial with respect to the disk for causing the slider to maintain a substantially constant flying height.

2. The data handling apparatus according to claim 1, wherein the slider has a second center line with respect to which the slider is substantially symmetrical, the second center line of the slider being arranged to substantially coincide with a tangent line to the innermost track of the disk when the slider is located on the innermost track.

3. The data handling apparatus according to claim 1, wherein the slider has a second center line with respect to which the slider is substantially symmetrical, the second center line of the slider being inclined inward relative to a tangent line to the innermost track of the disk when the slider is located on the innermost track.

4. The data handling apparatus according to claim 1, wherein the slider is positioned closer to the first center line when the slider is located on the outermost track than when the slider is located on the innermost track.

5. The data handling apparatus according to claim 1, wherein the slider is provided with a first objective lens.

6. The data handling apparatus according to claim 5, wherein the first objective lens is positioned closer to the trailing portion of the slider than to the leading portion thereof.

7. The data handling apparatus according to claim 5, wherein the driving mechanism includes an actuator supporting a second objective lens, and further wherein the first and the second objective lenses are arranged to work together to provide a lens system.

8. The data handling apparatus according to claim 1, wherein the slider comprises a magnetic head.

* * * * *

UNITED STATES PATENT AND TRADEMARK OFFICE
CERTIFICATE OF CORRECTION

PATENT NO. : 6,341,102 B1
DATED : January 22, 2002
INVENTOR(S) : Sato et al.

It is certified that error appears in the above-identified patent and that said Letters Patent is hereby corrected as shown below:

<u>Title page,</u>
Item [56], References Cited, FOREIGN PATENT DOCUMENTS, delete "JP 4325464" and insert -- 5325464 -- therefor.

Signed and Sealed this

Tenth Day of September, 2002

Attest:

JAMES E. ROGAN
Attesting Officer
Director of the United States Patent and Trademark Office